R. T. CALLOWAY.
COMBINED SWITCHING AND PROTECTIVE UNIT FOR ELECTRICAL TRANSMISSION LINES.
APPLICATION FILED MAR. 29, 1920.

1,389,623.

Patented Sept. 6, 1921.

Inventor
Russell T. Calloway
By Brown Borticen
Denner
Att'ys

R. T. CALLOWAY.
COMBINED SWITCHING AND PROTECTIVE UNIT FOR ELECTRICAL TRANSMISSION LINES.
APPLICATION FILED MAR. 29, 1920.

1,389,623.

Patented Sept. 6, 1921.
2 SHEETS—SHEET 2.

Inventor
Russell T Calloway
By Brown Boucher
& Diener
Att'ys

UNITED STATES PATENT OFFICE.

RUSSELL T. CALLOWAY, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

COMBINED SWITCHING AND PROTECTIVE UNIT FOR ELECTRICAL TRANSMISSION-LINES.

1,389,623.      Specification of Letters Patent.      Patented Sept. 6, 1921.

Application filed March 29, 1920. Serial No. 369,533.

*To all whom it may concern:*

Be it known that I, RUSSELL T. CALLOWAY, a citizen of the United States, residing at Chicago, in the county of Cook and State of Illinois, have invented a certain new and useful Improvement in Combined Switching and Protective Units for Electrical Transmission-Lines, of which the following is a full, clear, concise, and exact description, reference being had to the accompanying drawings, forming a part of this specification.

My invention relates to a combined switching and protective unit for electrical transmission lines. More specifically, it has reference to an improved form of combined switching and protective unit for use in small, pole-top installations, such as farm "substations" for connecting a farm light and power system to a rural high tension transmission line.

With the wider distribution of the electricity in the rural districts by numerous high tension transmission lines, and the more extensive use of electricity on the farm there has developed the necessity for substation equipment suitable for these small farm installations. Such installations have as a primary requisite that the apparatus be of simple and inexpensive construction, owing to the fact that the amount of power used will generally not warrant a large and expensive installation. A further requirement is that the apparatus be capable of convenient and ready mounting without necessitating extensive supporting structure in the nature of a switching tower or additional supporting poles. A still further requirement is that the apparatus afford a maximum degree of protection to the transformer, and to the secondary system against line surges and lightning discharges.

In devising a form of substation equipment which will fulfil these requirements, I have grouped the several elements of the switch and protective apparatus in the form of a novel combination fixture or unit. The several elements of the apparatus are mounted on an improved angular formation of mounting base, and by the novel relation of these elements on this angular formation of base, I am enabled to dispense with two or more supporting insulators together with their clamps and pins, and to obtain a very simple and inexpensive form of mounting for the apparatus.

The combining of the protective and switching apparatus on an angular mounting base affords a unit construction which can be readily mounted directly upon the cross arms of the line pole. By virtue of the angular formation of the mounting base, the combined unit takes up only a small horizontal space and can, therefore, be conveniently mounted on the cross arms of a single pole.

The angular formation of the mounting base has the further advantage of permitting the proper disposal of each of the electrical units with regard to its particular function whereby the lightning discharge gap is properly positioned for effective quenching of arcs, and the switching and fuse apparatus is properly positioned for convenient operation and renewal.

Figure 1:
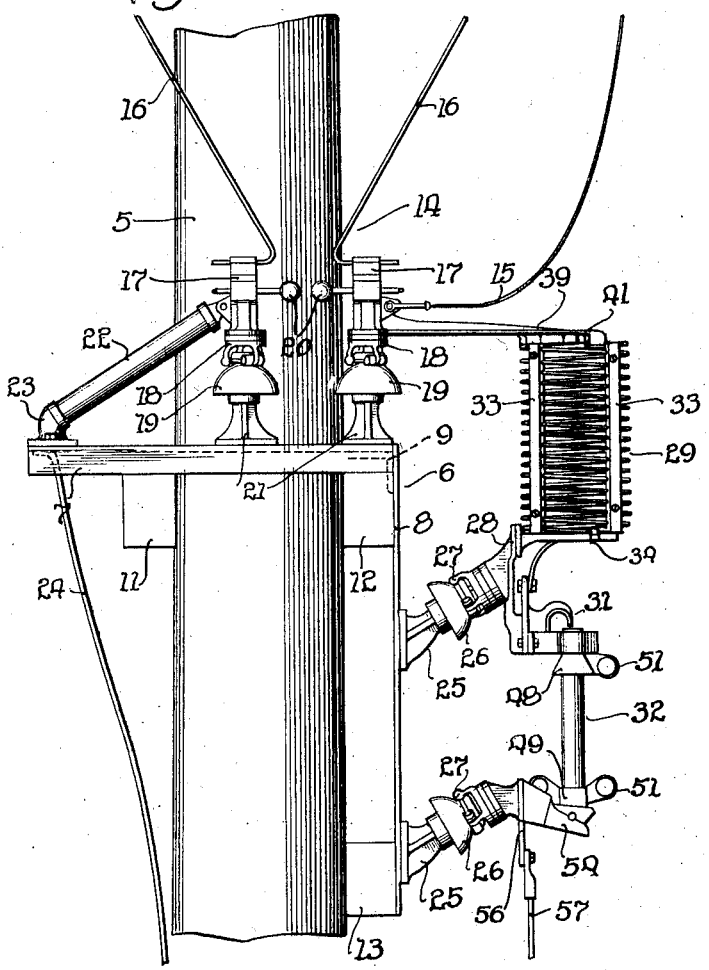
Figure 1 is a side elevational view of my improved switching and protective unit, mounted upon a transmission line pole.
Figure 2:
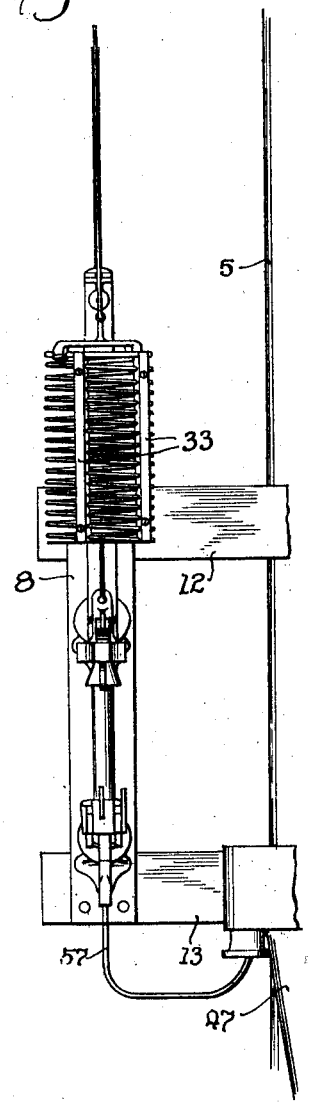
Fig. 2 is an end elevational view of the same.

The unit is adapted to be mounted on cross arms on the pole 5, preferably at a point a few feet below the cross arm which supports the line wires (not shown). Only one unit is shown, it being understood that there is a separate unit for each line wire. In the case of a single phase circuit, the other unit is mounted on the other ends of the supporting cross arms on the other side of the pole. In a three phase system, the units may be arranged on the cross arms in any preferred relation.

Each unit comprises a supporting base which is designated 6 in its entirety, and which is of angular or inverted L formation.

The horizontal limb of the supporting base preferably consists of a short section of inverted channel bar 7. The vertical limb of the supporting base preferably consists of a narrow plate 8, which is rigidly connected to the end of the channel bar 7 by a short section of angle bar 9, which is secured or riveted to each limb of the supporting base. The horizontal limb 7 of the base is adapted to rest upon two horizontal cross arms 11 and 12, to which the channel member is bolted or otherwise secured. The cross arms 11 and 12 are mounted upon opposite sides of the pole 5, being preferably disposed in parallel relation to the cross arm which supports the line wires, so as to place each unit in a plane parallel to its respective line wire. The lower end of the vertical limb 8 of the supporting base is bolted or otherwise secured to a third cross arm 13, which is mounted on the pole 5, directly below the cross arm 12.

Mounted on the horizontal limb 7 of the supporting base is the lightning arrester 14, which has direct connection with the line wire overhead through a wire 15, which taps onto the line wire. The lightning arrester 14 comprises a high speed sphere gap formed by the two sphere terminals 20, and a pair of arcing horns 16—16, for receiving the arcs drawn between the sphere electrodes 20. It will be apparent that lightning arresters employing other arrangements of spark gaps may be employed, instead of the above type. The sphere electrodes 20 and the diverging horn electrodes 16 are adjustably supported in vertical standards 17—17, which are bolted to insulator clamps 18 on the upper ends of the insulators 19. The insulators 19 are supported upon pedestal bases 21, which are suitably fastened on the horizontal channel member 7. The tap 15 from the overhead line wire is connected to the right hand side of the lightning arrester, and therefore, this side is always subject to line potential. The other side of the lightning arrester is connected to ground through a resistance rod 22, which extends down diagonally from the left hand standard 17 to the base member 7. The resistance rod 22 is constructed of an outer shell of insulation in which are disposed a series of resistance rods having a high resistance for limiting the discharge of dynamic current when a discharge takes place across the gap. The lower end of the resistance rod 22 is set in a socket fitting 23, which is bolted to the end of the channel member 7. The ground connection is continued from the channel member 7 through a heavy strand 24, which is suitably connected to the channel member and extends down to ground.

Extending diagonally outward from the vertical limb 8 of the supporting base are a pair of insulator supports 25 which are screwed to the plate 8. These supports carry insulators 26—26, which in turn support at their outer ends insulator clamps 27—27. The insulators 19 and 26, together with the supporting pedestals and insulator clamps constitute part of a standardized system of fittings, so as to permit of the ready substitution of different size insulators for different potentials. The upper insulator clamp 27 has screwed thereto a combination bracket 28, which supports at its upper end a choke coil 29, and at its lower end the jaw terminal 31 of a fused disconnect 32. The choke coil 29 consists of a helical coil of relatively heavy wire, the adjacent turns of which are maintained in spaced relation by spacer sticks 33. These spacer sticks are preferably constructed of wood, each stick consisting of two coöperating sections, having matching grooves in their faces for engaging over the several turns of the helical coil. The use of these spacer sticks adds rigidity to the coil and prevents sagging of the turns thereof. The lower end of the choke coil 29 is supported upon a horizontal choke coil bracket 34, which is preferably of the same general construction as that disclosed in Patent No. 1,274,555, issued to Ernest H. Jacobs. This choke coil bracket comprises three equidistant arms 35 (Fig. 3), the ends of which are provided with adjustable clips 36 for embracing the lowermost turn of the choke coil. The bracket 34 is formed with an enlarged mounting plate extension 37, which is screwed to a similar formation 38 on the upper end of the combination bracket 28. The upper end of the choke coil 29 is supported by a horizontally extending bracket 39, which extends laterally from the adjacent standard 17 of the lightning arrester. This extending bracket may be formed integrally with the standard 17, or may be formed with a separate plate connection for clamping between the insulator clamp 18 and the standard 17. The outer end of this bracket extension 39 may have clamped connection with the upper end of the choke coil 29 in any suitable manner, preferably, however, by the formation of a plurality of diverting arms 41, provided with adjustable clips at their ends, similar to the bracket 34, for clamping to the uppermost turn of the choke coil.

Figure 3:
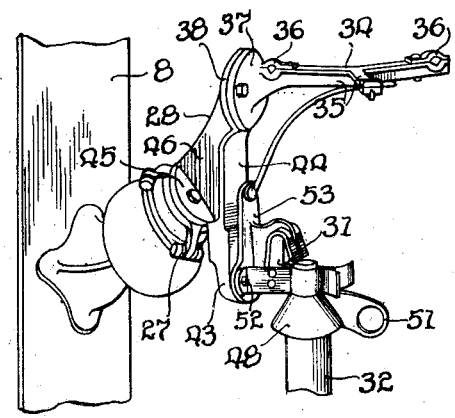
Fig. 3 is an enlarged perspective view of the combination bracket for supporting the choke coil and the upper end of the fused disconnect.

Referring to Fig. 3, the combination bracket 28 is formed with a downwardly extending portion 43, for supporting the jaw terminal 31 of the fused disconnect 32. As will be noted from this figure, the combination bracket 28 comprises an intermediate portion 44, connecting the upper mounting plate 38 with the lower mounting portion 43, this intermediate portion 44 being formed integral with a circular mounting plate 45, which is adapted to be screwed to the insulator clamp 27. The bracket is strengthened by a web portion 46, which extends from the center of the mounting plate 45 up to the upper part of the bracket.

The fused disconnect 32 is designed to function as a disconnect switch and also as a fuse for interrupting excessive current flow down to the transformer 47, such as might result from an abnormal condition of the line. The fused disconnect 32 is of the expulsion type, preferably of the general construction illustrated in the copending application of Ernest H. Jacobs, Serial No. 298,905, filed May 22, 1919, although it will be understood that other types of fuse or switch apparatus may be employed instead. The disconnect is provided with upper and lower ferrules 48 and 49 formed with eyes 51, which are adapted to be engaged by a suitable operating pole for opening the disconnect or for entirely removing the same for renewing the fusible link. The spring jar terminal 31 for engaging the upper ferrule 48 of the disconnect is screwed to the lower portion 43 of the bracket 28 as indicated at 52. The lower ferrule 49 is removably carried in a hinge jaw terminal 54, in which the ferrule also has pivotal support in order that the disconnect may be swung down about the lower terminal 54 for performing the switching operation. A terminal lug 56 projects down from the terminal 54 and has connection with a wire 57 which leads to the transformer 47. The transformer 47 is supported at its upper end upon the lower cross arm 13, and at its lower end upon another short cross arm below the cross arm 13, the secondary leads from the transformer being extended down to the power and lighting distribution circuits of the farm.

It will be observed from the foregoing that by the novel disposition of the several elements of the mounting base and by the provision of the supporting brackets 28 and 39, the necessity for individual insulators and insulator clamps and pins for the choke coil 29 has been entirely eliminated, thereby simplifying the construction of the unit and reducing its cost materially. It will also be observed that the angular or inverted L formation of the mounting base 6 results in a construction of short horizontal dimensions, and one which can be readily mounted upon the three cross arms of a single pole. The angular formation of the mounting base, furthermore provides a horizontal mounting surface for the lightning arrester, which must necessarily be mounted erect and at the same time provides a vertical mounting surface for mounting the fused disconnect in vertical position for convenient opening or withdrawal of the disconnect. The angular relation between the lightning arrester and the choke coil is also of advantage from the fact that it mechanically induces the discharge of an abnormal condition across the arrester gap, instead of down through the choke coil, by reason of the inertia of the discharge tending to continue in a straight line instead of turning through an angle for discharge down through the choke coil.

Figure 4:
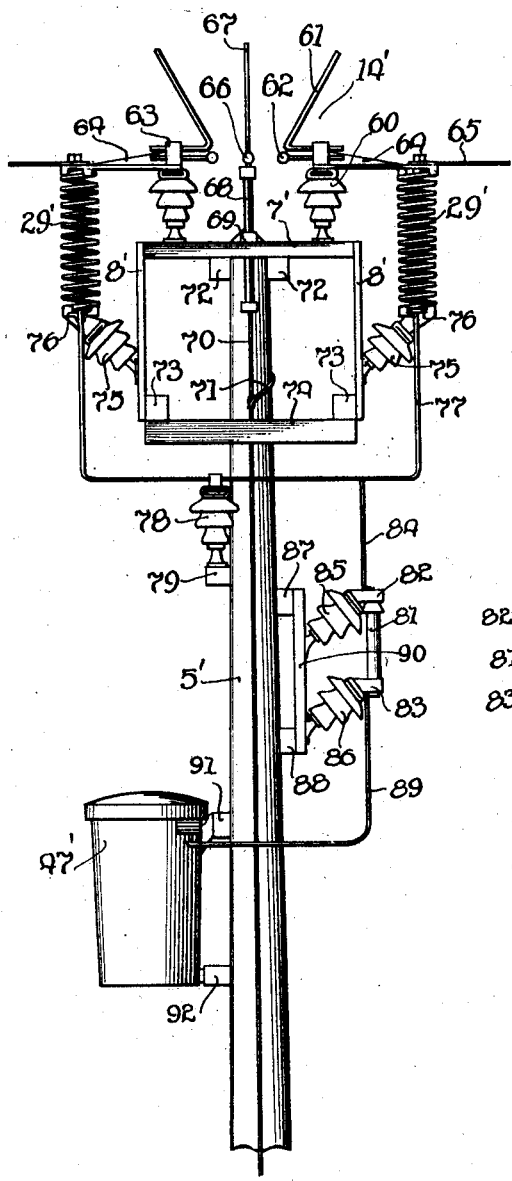
Figs. 4 and 5 are front and side elevational views respectively of a modified embodiment of my invention in position on a transmission line pole.
Figure 5:
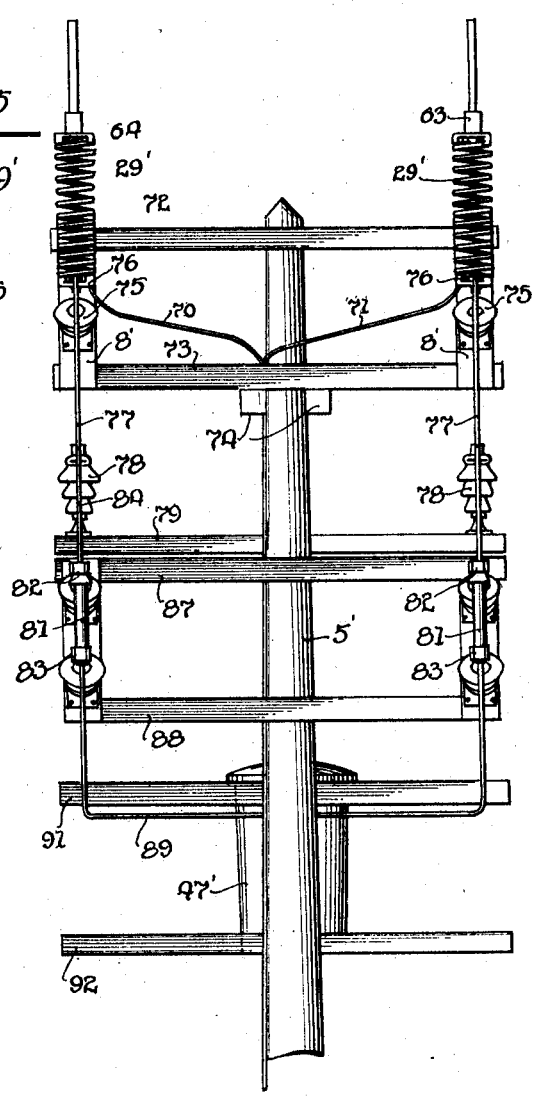

In Figs. 4 and 5, I have illustrated a modified form of protective combination for "farmer-line substations." In this modified arrangement, the protective apparatus is adapted for interposition directly in the transmission line for the purpose of relieving lightning discharges or surges from either side of the line and for preventing such discharges or surges from continuing past the sub-station and on down the transmission line. The lightning arrester 14', which is interposed directly in the transmission line, is mounted on the horizontal channel member 7'. The arrester comprises two insulators 60, which are mounted adjacent the ends of the channel member 7', and which support the arcing horns 61 and the spherical high-speed electrodes 62. The vertical standards 63, which support these electrodes, are formed with laterally extending brackets 64 which support the upper ends of the two choke coils 29', similarly to the bracket extensions 39 of the previous form. To the ends of these brackets 64 are connected the ends of the line wire 65. Located centrally between the two discharge electrodes is a grounded electrode 66, from which extends a vertical arcing rod 67, for coöperating with the arcing horns 61. The grounded electrode 66 is supported on a resistance unit 68, which is extended down through a hole in the channel bar 7', being supported in said hole by a flange collar 69. This resistance unit is preferably of the same general construction as disclosed in the copending application of Ernest H. Jacobs, Serial No. 376,954, filed November 10, 1919, and comprises an outer insulating tube in which is disposed a plurality of resistance rods of high resistance value and large capacity. The lower end of the resistance unit 68 has connection through a grounded bus 70 which is led over to the pole 5' and down to ground. The protective apparatus for the other transmission line is, of course, supported upon the opposite side of the pole 5', and has its resistance unit 68 connected to the grounded bus 70 through a wire 71. The channel bar 7' is bolted to a pair of parallel cross arms 72, which are spaced upon opposite sides of the pole 5'. The ends of the horizontal channel member 7', extend beyond the cross arm 72 on each side and support the two vertical plates 8', these plates being secured to the ends of the horizontal base member in any suitable manner and forming two vertical limbs on the mounting base.

The lower ends of these two mounting plates are secured to cross arms 73, which are spaced outwardly from the sides of the pole 5', being rigidly fastened to the ends of cross arms 74, which are in turn secured upon opposite sides of the pole 5'. Each of these vertical mounting plates mounts a single inclined insulator 75 for supporting the lower end of its respective choke coil 29'. The insulators 75 are provided with suitable insulator clamps, to which are secured choke coil brackets 76 comprising a plurality of clamping arms, similar to the previously described form of bracket 34. The bracket extensions 64 are also preferably provided with a plurality of radiating clamping arms for clamping the upper turns of the choke coils 29', the two choke coils being thus supported between the pairs of brackets 64 and 76.

The lower ends of both choke coils 29' are connected together by a bus connection 77, which is looped down below the lower ends of the mounting plates 8' and is supported on an insulator 78 mounted on the end of a cross-arm 79. In this embodiment the circuit interrupting apparatus is illustrated as consisting of any suitable high-tension fuse 81. This fuse is supported in terminal clips 82 and 83, the upper clip being connected to the bus wire 77 through a wire 84. Both terminal clips are supported on insulators 85 and 86, which are in turn mounted on a base 90 mounted on cross arms 87 and 88. The lower terminal clip has connection through wire 89 with the transformer 47' which is mounted on the pair of cross arms 91 and 92.

With this form of protective combination, it will be observed that the substation is protected against lightning discharges or other abnormal conditions arising on the line to either side of the substation; and furthermore, that any such discharge or surge will be prevented from continuing along the line and will be compelled to discharge to ground by the combined reactance of both choke coils, acting in series. For a three phase transmission line the third phase conductor and protective apparatus are mounted on the cross arms adjacent the pole 5'. I have not considered it necessary to illustrate this as the manner of mounting the same is obvious. When three phase current is to be taken off, the protective combination for the third phase is mounted on the parallel cross arms adjacent the pole 5', and a bank of three transformers 47' is mounted on the cross arms 91 and 92, as will be obvious to those skilled in the art.

I claim:

1. As an article of manufacture, a combined protective and switching unit of self-supporting character comprising a supporting base of angular formation, and having an upper horizontal limb and a depending vertical limb, a lightning arrester on the horizontal limb of said base, and a disconnect switch on the vertical limb of said base, said disconnect switch having electrical connection with the lightning arrester.

2. In a combined electrical unit, a supporting base of angular formation adapted for mounting on a plurality of cross-arms, said base comprising a horizontal limb and a vertical limb, a lightning arrester mounted solely on the horizontal limb of said angular supporting base and circuit interrupting means mounted solely on the vertical limb of said supporting base and having electrical connection with said lightning arrester.

3. As an article of manufacture, a combined protective and switching unit of self-supporting character employing a metallic base of angular formation having a horizontal limb and a vertical limb, a lightning arrester mounted solely on the horizontal limb, and a disconnect switch mounted solely on the vertical limb and being connected to the line side of the lightning arrester, the horizontal limb being adapted to rest on top of a double cross-arm and the vertical limb being adapted to rest on the side of a single cross-arm.

4. In a protective unit for pole-top installations, an angular supporting base comprising substantially horizontal and vertical supporting limbs, said supporting base being adapted for mounting on a series of cross arms on said pole, a lightning arrester on the horizontal limb of said supporting base, circuit interrupting apparatus on the vertical limb of said supporting base and a choke coil connecting said lightning arrester with said circuit interrupting apparatus and being supported between the lightning arrester and the circuit interrupting apparatus.

5. In a combined switching and protective unit for pole-top installations, a supporting base of inverted L formation, said supporting base being adapted for mounting on the cross arms of a single pole, a lightning arrester on the horizontal limb of said supporting base, a fused disconnect on the vertical limb of said supporting base, and a choke coil connecting said lightning arrester with said fused disconnect and connected mechanically and electrically between them.

6. In a combined switching and protective unit for pole-top installations, an angular supporting base comprising substantially horizontal and vertical limbs, the horizontal limb of said supporting base being adapted for mounting on a pair of spaced horizontal cross arms, and the vertical limb of said base being adapted for connection to a lower cross arm on said pole, a lightning arrester on the horizontal limb of said base, switch mechanism on the vertical limb of said base, and a choke coil connecting said lightning arrester with said switch mechanism.

7. In a device of the class described, a supporting base comprising a pair of supporting limbs disposed at substantially right angles, one of said limbs being disposed horizontally and the other vertically, a pair of supporting insulators on the horizontal limb of said base, a lightning arrester mounted on said pair of insulators, a second pair of insulators supported on the vertical limb of said base, circuit interrupting means mounted on said second pair of insulators, and means having connection with said lightning arrester and with said circuit interrupting means, for suspending a choke coil therebetween.

8. In a device of the class described, a mounting base comprising a pair of supporting limbs angularly disposed one of said limbs lying in a horizontal position and the other lying in a vertical position, a pair of insulators mounted on the horizontal limb of said supporting base, lightning arrester electrodes supported on said pair of insulators, a second pair of insulators mounted on the vertical limb of said supporting base, combined fuse and switch apparatus supported on said second pair of insulators, and supporting brackets extending from the adjacent insulators of each pair for suspending a choke coil therebetween said choke coil lying in a vertical position.

9. In a device of the class described, a supporting base of inverted L formation, a pair of insulators mounted on the horizontal limb of said supporting base, lightning arrester electrodes supported by said pair of insulators, a second pair of insulators mounted on the vertical limb of said supporting base, a fused disconnect supported on said second pair of insulators, a bracket extending from the upper insulator of said second pair, a bracket extending from the adjacent insulator on said first pair of insulators and a choke coil supported in vertical position between said brackets.

10. In a device of the class described, a supporting base adapted to be disposed vertically, a pair of insulators mounted on said supporting base, a fused disconnect adapted to be supported by said insulators, a choke coil adapted for connection with the upper end of said disconnect, a combination bracket secured on one of said insulators, terminal means carried by said bracket for receiving said fused disconnect, and clamping means also carried by said bracket for engaging the end turn of said choke coil.

11. In a device of the class described, a transmission line pole, a pair of spaced horizontal cross arms mounted on said pole, a combined switching and protective unit comprising an angular supporting base having substantially horizontal and vertical supporting limbs, said horizontal supporting limbs being secured to said horizontal cross arms, a third cross arm mounted on said pole below said pair of cross arms, the vertical limb of said supporting base being secured to said third cross arm, a lightning arrester on the horizontal limb of said supporting base, automatic circuit interrupting means on the vertical limb of said supporting base and a choke coil connected between said lightning arrester and said automatic circuit interrupting means, said choke coil being mechanically and electrically connected to the line side of the lightning arrester.

12. In a protective electrical device of the class described, a supporting base of angular formation comprising substantially horizontal and vertical supporting limbs, a lightning arrester mounted on the horizontal limb of said supporting base and adapted for connection with the line, and a choke coil mounted on the other limb of said base at substantially right angles to said lightning arrester and connected therewith both mechanically and electrically.

13. In a protective unit for pole top installation, an angular supporting base comprising substantially horizontal and vertical supporting limbs, said supporting base being adapted for mounting on a series of cross arms on said pole, insulator means on said horizontal limb, a lightning arrester mounted on said insulator means, insulator means on said vertical supporting limb and a choke coil having supporting connection with said latter insulator means and lying in a vertical position parallel to said vertical limb, said choke coil also having connection with said lightning arrester.

14. As an article of manufacture, a protective and switching unit comprising a metallic inverted L-shaped frame, a lightning arrester mounted on the horizontal limb, said arrester comprising a line electrode and a grounded electrode, the line electrode being placed adjacent the angle joining the two limbs, a ground connection between the grounded electrode and the free end of the horizontal limb, a fused disconnect mounted on the vertical limb of the frame, a bracket extending horizontally from the line electrode of the lightning arrester to a point above the disconnect, and a choke coil mounted on the end of said bracket and having its lower end connected to the upper end of the disconnect.

In witness whereof I hereunto subscribe my name this 24th day of March, A. D. 1920.

RUSSELL T. CALLOWAY.